United States Patent [19]

Nelson et al.

[11] Patent Number: 4,763,323

[45] Date of Patent: Aug. 9, 1988

[54] COMMUNICATION SYSTEM FOR THE TRANSFER OF SMALL DIGITAL MESSAGE BLOCKS AND LARGE DIGITAL MESSAGE BLOCKS

[75] Inventors: Owen L. Nelson; Charles L. Rennolet, both of St. Paul, Minn.

[73] Assignee: Minnesota Mining and Manufacturing Company, St. Paul, Minn.

[21] Appl. No.: 129,386

[22] Filed: Nov. 24, 1987

Related U.S. Application Data

[63] Continuation of Ser. No. 789,093, Oct. 18, 1985, abandoned.

[51] Int. Cl.$^4$ .............................................. H04J 3/16
[52] U.S. Cl. ....................................... 370/96; 370/90; 340/825.5
[58] Field of Search .................. 370/96, 85, 91, 89, 370/90, 99, 94, 60; 340/825.5, 825.08, 825.51

[56]  References Cited

U.S. PATENT DOCUMENTS

| | | | |
|---|---|---|---|
| Re. 31,319 | 7/1983 | Fraser | 370/80 |
| Re. 31,852 | 3/1985 | Soderblom | 370/90 |
| 3,700,820 | 10/1972 | Blasbalg et al. | 179/15 BV |
| 3,702,008 | 10/1972 | Groth | 370/96 |
| 3,749,845 | 7/1973 | Fraser | 179/15 AL |
| 4,063,220 | 12/1977 | Metcalfe et al. | 340/147 LP |
| 4,210,780 | 7/1980 | Hopkins et al. | 370/80 |
| 4,236,245 | 11/1980 | Freeny et al. | 370/94 |
| 4,251,880 | 2/1981 | Baugh et al. | 370/80 |
| 4,293,948 | 10/1981 | Soderblom | 370/90 |
| 4,320,467 | 3/1982 | Glass | 340/825.5 |
| 4,340,961 | 7/1982 | Capel et al. | 370/84 |
| 4,375,491 | 3/1983 | Honig | 428/167 |
| 4,380,065 | 4/1983 | Hirtle | 340/825.5 |
| 4,385,382 | 5/1983 | Goss et al. | 370/96 |
| 4,397,019 | 8/1983 | Alvarez et al. | 370/104 |
| 4,404,557 | 9/1983 | Grow | 340/825.05 |
| 4,420,831 | 12/1983 | Hackett | 370/50 |
| 4,423,507 | 12/1983 | Roger et al. | 370/89 |
| 4,445,116 | 4/1984 | Grow | 340/825.05 |
| 4,445,213 | 4/1984 | Baugh et al. | 370/94 |
| 4,454,508 | 6/1984 | Grow | 340/825.05 |
| 4,459,588 | 7/1984 | Grow | 340/825.05 |
| 4,460,993 | 7/1984 | Hampton et al. | 370/84 |
| 4,464,658 | 8/1984 | Thelen | 340/825.5 |
| 4,464,749 | 8/1984 | Ulug | 370/85 |
| 4,538,147 | 8/1985 | Grow | 340/825.05 |

FOREIGN PATENT DOCUMENTS

| | | | |
|---|---|---|---|
| 0030441 | 2/1982 | Japan | 370/96 |
| 0084046 | 5/1985 | Japan | 370/96 |

OTHER PUBLICATIONS

M. J. McGown—"Process Bus Protocol Orchestrates Distributed or Centralized Control"—Sep. 1980—*Control Engineering.*

(List continued on next page.)

*Primary Examiner*—Douglas W. Olms
*Assistant Examiner*—Curtis Kuntz
*Attorney, Agent, or Firm*—Donald M. Sell; William D. Bauer

[57]  ABSTRACT

A communication system for the transfer of small digital message blocks and large digital message blocks. A plurality of nodes are coupled to a common wideband communication channel capable of facilitating the transfer of small digital message blocks and large digital message blocks. One of the nodes is a master node controlling the communication of the communication channel by selectively polling the other of the plurality of nodes. The communication system has a first protocol for the transmission of small digital message blocks and a second protocol for the transmission of large digital message blocks. The master node establishes a polling priority for each of the plurality of nodes and polls those with a higher polling priority more frequently than those with a lower polling priority. The master node allows the one node being polled to communicate over the channel of either a small digital message block or a large digital message block. Further the master node adapts the polling priority for each of the nodes based upon a predetermined algorithm.

24 Claims, 5 Drawing Sheets

OTHER PUBLICATIONS

Edwin Hall & Roger Allen—"Local-Net Architecture Protocol Issues Heating Up—Apr. 16, 1981—*Electronic Design*, vol. 29, N8.

J. M. Kryskow & C. K. Miller—"Local Area Networks Overview-Part 1: Definitions and Attributes"—Feb. 1981—*Computer Design*.

Andrew S. Tannenbaum—"Computer Networks"—Chapter 1.

National Electrical Manufacturers—"ACR-NEMA" Digital Imaging and Communications Standards"—Jul. 1, 1985.

Institute of Electrical Electronic Engineers, Inc.—''IEEE Standard Digital Interface for Programmable Instrumentation"—1975.

COMMUNICATION SYSTEM FOR THE TRANSFER OF SMALL DIGITAL MESSAGE BLOCKS AND LARGE DIGITAL MESSAGE BLOCKS

This is a continuation of application Ser. No. 789,093 now abandoned, filed Oct. 18, 1985.

BACKGROUND OF THE INVENTION

The present invention relates generally to digital communication systems and more particularly to digital communication systems in which a number of digital handling devices are connected at nodes to a single communication channel.

Digital communication over a communication channel is well known in the art. To control the digital data communication occurring over a communication channel, a protocol is required in order to control the traffic or to decrease the error rate. The implementation of a protocol to handle the data communication on a channel dates back to the "bisync" and other sychronous protocols of the 1960's.

A given communication channel operates at a given transmission rate. Two major problems occur as the transmission rate of the communication channel is significantly increased. These major problems are the inherent bit error rate of the transmission media and the loss of synchronization due to lost messages or clock instability. These problems contribute to the overall probability of failure to deliver the proper message. The probability of an inability to deliver the message increases superlinearly as the size of the message, or frame, sent increases. A typical solution to this problem has been to break the data message up into small packets, each framed by synchronizing and error detection data to counteract these major problems. However, the framing overhead, i.e., the number of frame bits required to achieve the synchronization and error detection data, on a given data message may become a significant part of the overhead of the data communicated over the data communication channel Further, the necessity of serving a multiplicity of users over a single channel dictates a small frame size in order to make the communication channel available to all users. Since the data frames must be sent one at a time these data messages must be time division multiplexed to provide equitable response to the many users on the communication channel. Several techniques have been developed in the prior art in order to handle this time division multiplexing for a multiplicity of users are connected to a single communication channel.

One common technique is known as token passing. A token, a special bit pattern, is circulated over the communication channel serially among the various users and only the user receiving, or capturing, the token is allowed to initiate communication over the communication channel. When that user is done communicating over the channel, the user passes the token onto the next possible user. See, for example, U.S. Pat. No. 4,293,948 and U.S. Pat. No. 4,464,749.

Another protocol known in the prior art is the "first-come first-served" method but with a method of collision detection. This protocol is the so called CSMA/CD protocol See, for example, U.S. Pat. No. 4,464,658, U.S. Pat. No. 4,210,780 and U.S. Pat. No. 4,063 220.

The token passing and CSMA/CD protocols result in further framing and arbitration overhead on a given digital data message which increases exponentially as the digital data message communication traffic increases over the communications channel. For example, a common implemention of the CSMA/CD protocol, Ethernet (Ethernet is a trademark of Xerox Corporation), uses packet size and framing techniques which can cause a reduction in message carrying efficiency by as much as 40% in situations of heavy load, i.e., many simultaneous users, or large amounts of digital data to be transmitted. Another problem with these "open access" protocols is that when the blocks of data needed to be sent are large and the individual frames are small, the total time needed to complete the data transmission can be very long. This is because many user stations are sharing the single communication channel in small increments of time. For large data block transmissions this is not an efficient use of communication channel resources.

Thus, there exists a need to have a communication system utilizing a single communication channel to efficiently service a multiplicity of users and which can be efficient in transmitting both small data blocks and large data blocks as the users of the communication channel desire.

SUMMARY OF THE INVENTION

The present invention provides a communication system, and method for controlling the communication within that communication system, which allows the communication channel to adapt itself to the type of data being transmitted and to the users frequency of use by changing the frame size by orders of magnitude and to control access to the communication channel via a polling priority scheme. The present invention allows the communication channel to be utilized to within 95% or better of the capacity of the communication channel while still providing time division multiplexed service to a multiplicity of users including those having large blocks of data to transmit.

Thus, the present invention provides for a communication system for the transfer of small digital message blocks and large digital message blocks. A common wideband communication channel is provided capable of facilitating the transfer of small digital message blocks and large digital message blocks. Users of the communication system are connected to the communication channel by one of a plurality of nodes coupled to the communication channel. Each of the plurality of nodes is capable of communicating over the communication channel and each is adapted to be coupled to a digital handling device, namely, the user of the communication channel. One of the plurality of nodes is designated as a master node. The master node controls communication on the channel by selectively polling the other of the plurality of nodes. The communication system has a first protocol for the transmission of small digital message blocks and has a second protocol for the transmission of large digital message blocks. The master node establishes a polling priority for each of the plurality of nodes and polls those of the plurality of nodes with a higher polling priority more frequently than those of the plurality of nodes with a lower polling priority. The master node allows the one of the plurality of nodes which is being polled to communicate over the channel with either a small digital message block or a large digital message block. The master node further adapts the polling priority for each of the plurality of nodes based upon a predetermined algorithm, which in a prefered embodiment is based upon whether the prior digital message communication of that particular node is a small message block or a large message block and whether that nonmaster node has recently had a digital message communication or whether it responded to the poll of the master node.

The present invention further provides a communication system which includes a timing device for each of the plurality of nodes wherein each of the plurality of nodes may assume active master node status when the amount of time during which a nonmaster has not been polled exceeds a predetermined set amount of time unique to each of the plurality of nodes.

The present invention also provides a method of establishing communication in a communication system having a wideband common communication channel having a master node and a plurality of nonmaster nodes each being coupled to the communication channel and each capable of transmitting and receiving digital messages, with each of the plurality of nodes being coupled to a data handling device. The communication system being designed for the transfer of large digital message blocks and of small digital message blocks. The method has the following steps. The method first determines the polling priority for each of the plurality of nonmaster nodes. The master node then sucessively polls each of the plurality of nonmaster nodes. The master node polling those of the nonmaster nodes with a higher priority more frequently than those having a lower polling priority The method allows the one of the plurality of nonmaster nodes which is being polled to communicate over the communication channel with either a small message block or a large message block. The method adapts the polling priority for each of the plurality of nonmaster nodes based upon whether a given one of the plurality of nonmaster nodes has recently had a digital message communication and based upon whether such digital message communication was a small message block or a large message block.

BRIEF DESCRIPTION OF THE DRAWINGS

The following advantages, construction and operation of the present invention will become more readily apparent from the following description and accompanying drawings in which.

DETAILED DESCRIPTION OF THE PREFERRED EMBODIMENTS

Figure 1:
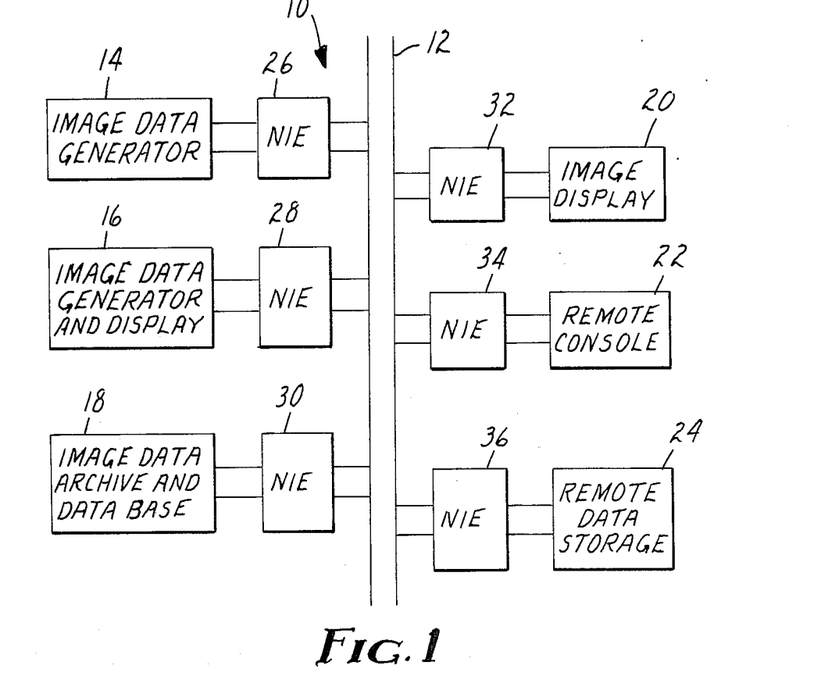
FIG. 1 is a general block diagram of a communication system of the present invention.

FIG. 1 illustrates a block diagram of a communication system 10 showing the general environment of the present invention. A broad band communication channel 12 is common to the communication system 10. It is contemplated that communication channel 12 may physically take the form of any number of physical communication media such as twisted wire pair, coaxial cable or fiber optics medium. The particular physical aspect of communication channel 12 is not crucial to the functioning of communication system 10. Communication channel 12 must be capable of transmitting or passing digital data messages among the various users to the communication system 10. A plurality of users are shown coupled to the communication channel 10. In particular, in the prefered environment where the communication system 10 of the present invention finds use, the various users of the communication system 10 may include an image data generator 14, an image data generator and display 16, an image data archive and data base 18, an image display 20, a remote control 22 and a remote data storage element 24. These user elements to the communication system 10 are merely exemplary. The communication system 10 is useable in any environment where a plurality of digital handling devices are designed to be coupled to the communication channel 12. The image data generator 14, the image data generator and display 16, the image data archive and data base 18, the image display 20, the remote control 22 and the remote data storage element 24 are standard devices and their exact function, description and construction is not crucial to the operation of the present invention. Each of these user elements 14, 16, 18, 20, 22 and 24 are coupled to communication channel 12 through a network interface element 26, 28, 30, 32, 34 and 36, respectively. Each network interface element (26, 28, 30, 32, 34 and 36) represent a node on communication channel 12. It is the responsibility of each network interface element, or node, to control the actual digital data communication on communication channel 12 as well as handle the interface of digital data between the network interface element, e.g., 26, and its associated digital handling device, e.g., image data generator 14. It is the operation of the particular network interface elements 26, 28, 30, 32, 34 and 36, or nodes, which make the communication system 10 of the present invention unique. The network interface elements 26, 28, 30, 32, 34 and 36 control the communication protocol of the digital data communications occurring on communication channel 12.

Figure 2:
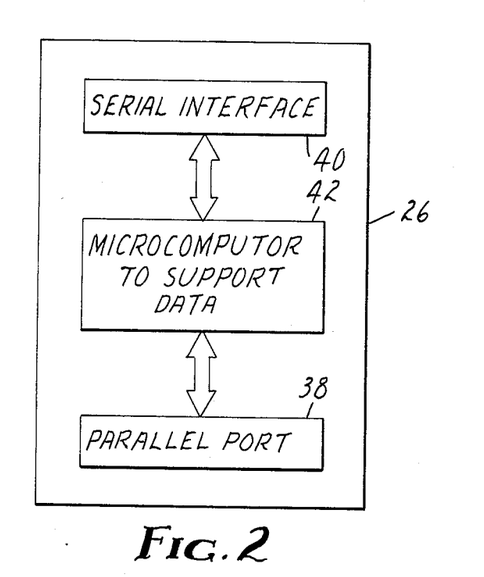
FIG. 2 is a block diagram of a exemplary network interface element.

FIG. 2 illustrates a block diagram of the internal construction of an exemplary network interface element 26. It is contemplated that network interface elements 28, 30, 32, 34 and 36 illustrated in FIG. 1 will also have the same basic construction illustrated in FIG. 2 for network interface element 26. Network interface element 26 consists of three major blocks to perform three major functions.

Parallel port 38 is a parallel data communications link designed to connect the network interface element 26 to its associated data handling device, namely, image data generator 14. The hardware of parallel port 38 is standard off the shelf commercial hardware and is selected to adapt to the particular parallel data requirements of image data generator 14. The particular selection of the hardware for parallel port 38 depends upon the particular digital handling device connected to that particular network interface element. Selection of this hardware would be elementary to any routineer in the art. While it is contemplated that parallel port 38 is to function for a parallel data interface between network interface element 26 and image data generator 14, it is to be recognized and understood that the function of parallel port 38 is to facilitate data communications between network interface element 26 and image data generator 14. If image data generator 14 requires or allows for other forms of digital data communication, e.g., serial communications, then parallel port 38 could in fact be a serial communications port or other port as required by the particular digital handling device.

Serial interface element 40 serves as the data communications link between network interface element 26 and communication channel 12. While it is contemplated that the digital data communication on communication channel 12 will consist of serial data communications, it is to be recognized and understood that in another environment or another physical implementation of communication channel 12 that serial interface 40 could in fact be a parallel interface element. The function of serial interface element 40 is to facilitate the data communications between network interface element 26 and communication channel 12. Serial interface element 40 is constructed from standard off the shelf commerically available hardware. The particular hardware selected depends in part upon the particular physical communications and media selected for communication channel 12 and on the microcomputer of the network interface element 26 to which it connects. It is elementary for any routineer in the art to select the particular serial interface element 40 to be utilized.

The remaining major block of network interface element 26 is microcomputer 42. Microcomputer 42 serves to support the data path between the digital handling device to which it is connected and to the communication channel 12. The microcomputer 42 implements the communication protocols with respect to the communication channel 12 and its associated data handling device. The protocols to support the data path which is implemented by microcomputer 42 is the basis for the present invention. The following description will explain in detail the function and structure necessary to implement microcomputer 42. While it is expected that the function achieved by microcomputer 42 would be implemented by a microcomputer it is to be recognized and understood, however, that other physical implementations, e.g., complete hardware logic, is contemplated and within the scope of the present invention.

Each node, network interface elements 26, 28, 30, 32, 34 and 36, may wish to communicate on the communication channel 12, commonly referred to as a bus, with one of the other nodes with a digital message which may consist of a small digital message block or a large digital message block. Small digital message blocks are typically transmitted in short blocks, or frames, with simple error checking. Short frames of simple error checking allows for the efficient use of communication channel 12. An example of a short message block would consist of a source address (one byte), a destination address (one byte), the message type (one byte), the length (one byte), the data (which may consist of 0 to 256 words) and an error detection or correction code (one word). In the preferred embodiment of the present invention, a byte consists of 8 digital bits and a word consists of 16 digital bits. The transmission of small digital message blocks is controlled in the communication system 10 of the present invention with what is termed as a base protocol.

A second protocol is utilized in the communication system 10 of the present invention for the transmission of large digital message blocks which is termed a data protocol. Long message blocks or long frames are typically handled with a handshake acknowledge technique. With a handshake acknowledge technique, the sending unit will indicate that the data is ready to be sent, the receiver will acknowledge that it is ready to receive the data, the message will be sent in one continuous block, the receiver will acknowledge its receipt and the sender will terminate the message transmission. In the present invention, such large digital message blocks may be divided into a plurality of frames which may be still larger than a short message block but may not be the entire large message which is to be transmitted. During such a large message transmission then, other users of the communication system 10 may be serviced on an interleaved basis. A typical large digital message block, or frame, would consist of a source address (one byte), a destination address (one btye), a message type (one byte), a message length (one byte), an error detection or correction code (one word) and from 1 to 4 blocks of data where a block of data is, for example, 2,048 words. Identifying and error correction or detection words would be added to each block of data sent.

The communication system 10 of the present invention operates with one network interface element 26, 28, 30, 32, 34, 36, or node, operating as a master node and all other network interface elements, or nodes, operating as nonmaster nodes. As an example, network interface element 26 may operate as a master node and the remaining network interface elements 28, 30, 32, 34 and 36 operate as nonmaster nodes. In another circumstance or at another point in time, network interface element 26 may be converted to nonmaster node status and one of the other previous nonmaster nodes could be elevated to master node status. The master node is responsible for controlling all communications over the communication channel 12. In the present invention, the nonmaster nodes are polled, i.e., asked about their status, by the master node. The nonmaster nodes then individually respond to the master node when polled from that master node. The poll from the master node to a nonmaster node consists of a short digital message block. The polled nonmaster node responds to the master node with a short frame of data indicating that no services are required or requesting service over the communication channel 12 with either a small digital message block or a large digital message block. If the nonmaster node desires to send a short digital message block, typically a frame of less than 4,096 bits, the nonmaster node simply sends the message directly in response to the poll from the master node as a small digital message block. If the polled nonmaster node needs to send a large digital message block, typically much larger than 4,096 bits, then the nonmaster node responds to the poll of the master node with a request to establish data connection with another node. The communication system 10 through the master node then prepares to establish the communication link between the sending nonmaster node and the receiving node, which may or may not be the master node, and the master node then continues its polling process. When the receiving nonmaster node is polled and responds with acceptance for a large digital message block, the master node relinquishes control of the channel to the sending nonmaster node for the large message block transfer. As an example, the large digital message block may be up to 524,288 bits (64 kilobytes). Following the termination of the large digital message block transfer, the master node then resumes polling the other nonmaster nodes according to its predetermined algorithm. When polled, the receiving nonmaster station responds to the master node with a short digital message block indicating error free receipt of the large message block or a short digital message block requesting retransmission due to error. Since the entire data transmission may be larger than a large digital message block when the nonmaster sending station is polled, it again responds with an indication that is ready to continue the block transmission and the process is repeated. When all large digital message blocks of the communication are sent and acknowledged, the sending nonmaster node, in response to a poll, indicates no further service is required.

When there is no large amount of data needed to be transfered by any node on the communication channel 12, all communication on the communication channel 12 will consist of polls by the master node and response to polls by the nonmaster nodes. These polls and responses may additionally carry up to 256 words of data. It is the responsibility of the master node to keep track of and adjust the priorities of the nonmaster nodes and to poll those nonmaster nodes with a higher polling priority more frequently than those with a lower polling priority. Thus, only nonmaster nodes known by the master node to require servicing are polled on a more frequent basis. Periodically, however, the master node does poll all nonmaster nodes to determine their communication needs. Thus, all users of the communication system 10 are serviced and the communication system 10 operates efficently. The master node keeps track of and dynamically readjusts the polling priorities based upon the prior responses of each individual nonmaster node and hence the priorities are adjusted accordingly. By the proper choice of large digital message block size and the dynamic adjustment of polling priorities by the master node, all users communicating on the communication system 10 are serviced via the small digital message blocks, in response to polls, while the users communicating with large digital message blocks have adequate access to the communication channel 12 to complete those message transmissions in a timely fashion.

In a preferred embodiment, the master node polls the nonmaster nodes in a regular pattern. This regular pattern is determined by the level of activity of the nonmaster nodes as well as perhaps other facts known to the master node. For example, a nonmaster node which is engaged in sending or receiving a large message block or a series of large message blocks may be assigned a higher polling priority by the dynamic action of the master node. Conversely, a nonmaster node which has not answered the poll of the master node for several cycles of the polling process may be polled only at long fixed time intervals. Given that all possible nodes on the communication channel 12 are polled at long fixed time intervals, the communication system 10 allows for the automatic entrance and exit of nonmaster nodes to or from the communication channel 12 since each possible nonmaster node will be polled at sometime. A response may elevate the polling priority of that node and the lack of response to a particular node may decrease the polling priority for that node.

Figure 3:
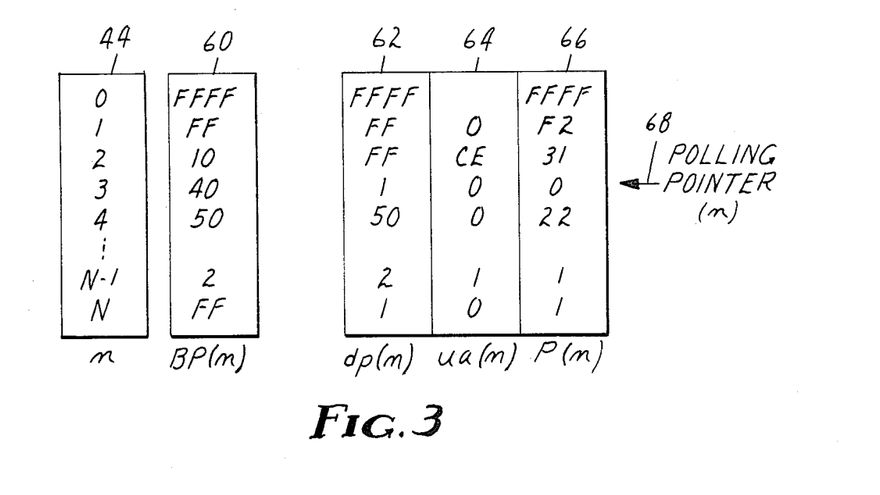
FIG. 3 illustrates an exemplary polling priority table consistent with the present invention.

An example of the polling prioritization which may be set up by the master node 26 is illustrated by the tables of FIG. 3. In the polling priority tables of FIG. 3, all possible node addresses on the communication channel 12 are listed in column 44. These possible node addresses range from address 0, address 1, address 2, address 3, address 4, address N−1 and address N. The basic polling priority established for each node is illustrated in column 60. The basic polling priority of a node is provided in hexidecimal form with the maximum polling priority of 1 and a minimum polling priority of FF, in hexidecimal. The polling priority of node 0 is indicated as FFFF to indicate that node 0 serves as the master node in the communication system 10 exemplified by the polling priority tables of FIG. 3. It can be seen by reference to the basic polling priority of column 60 that node 1 and node N have the lowest basic polling priority of FF while node N−1 has the highest polling priority of 2. The basic polling priority established in the priority tables of column 60 has either been formed through initial parameters known by the master node when the communication system 10 was established or has been developed through the use and experience of communicating on the communication system 10. In another example, of course, each node of communication system 10 may initially start with equal polling priorities. From the basic polling priority of the various nodes, a dynamic polling priority is constructed as illustrated by column 62. Again, node 0 is indicated as the master node with a dynamic polling priority of FFFF The dyanamir polling priority entry for each node is adjusted based upon whether that particular node is sending and/or receiving a large digital message block and based upon the number of polls to that particular node which went unanswered. For the latter purpose, the number of polls which went unanswered may be kept as indicated in column 64, where nodes 1, 3, 4 and N kept have 0 number of unanswered polls. The dynamic polling priority of node 2 has been decreased to FF since the entry in column 64 indicates that node 2 is inactive. From the basic polling priority, the dynamic polling priority and the number of unanswered polls, a polling table as indicated by column 66 can be constructed. The polling pointer 68 is currently pointing at node 3 indicating that node 3 is currently under consideration to be polled. Since the polling table value node 3 is currently set at zero, it will be polled. The value in the polling table for node 0 is again set to FFFF to indicate that it is the master node. The values in the polling table of column 66 have been adjusted for the other nodes to reflect the recent history and polling status. A higher number in the polling table indicates that that entry will be polled less often and a lower entry indicate that it will be polled more often.

Figure 4:
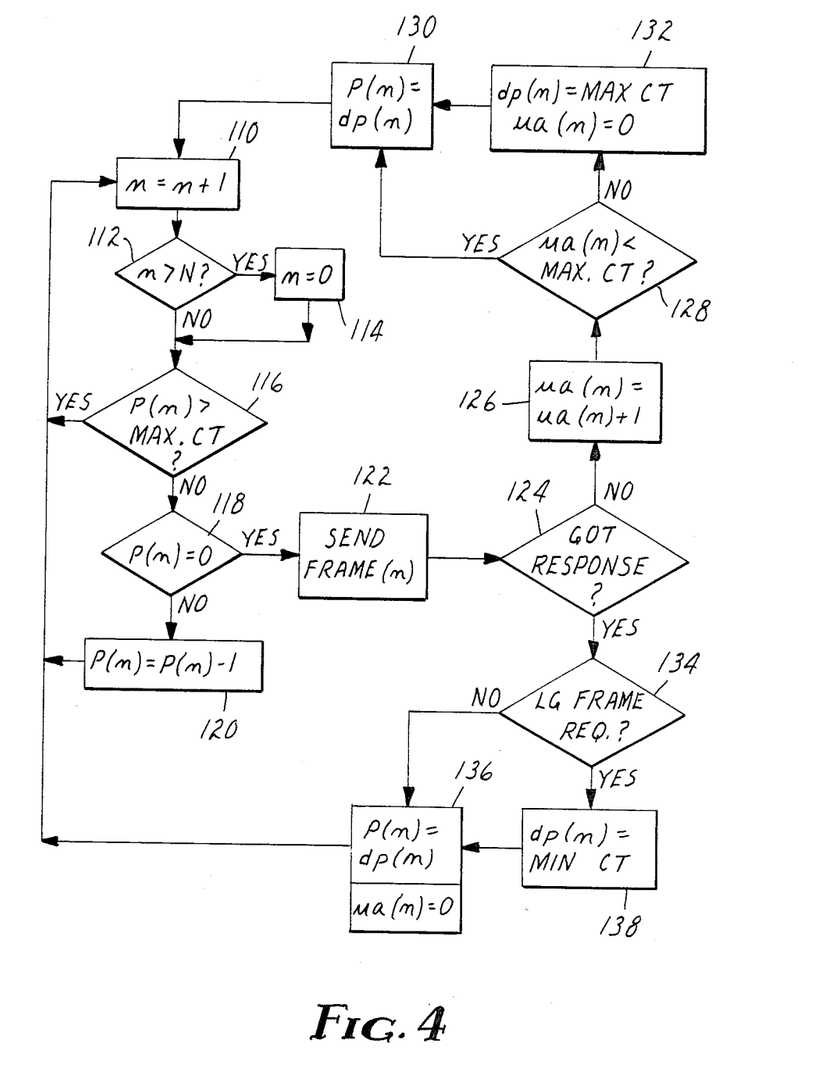
FIG. 4 is a flow chart of a polling process of the present invention.

An example of the actual polling process by the master node and the dynamic rearrangement of polling priorities can be better illustrated by the flow chart of FIG. 4. At block 110 the master node has completed its examination of the polling table for one node address, e.g., node 3 of the polling priority table of FIG. 3 and is incrementing the node address, n, by 1 to move the polling pointer 68 to the next node address 44 with the polling pointer 68 then pointing to the next node address 44, e.g., node 4, the polling process at block 112 determines if the node address 44 is greater than the number of node addresses N. If so, the next proper node address is node address 0 hence block 114 sets the polling pointer 68 to node address 0. If not, the process at block 116 determines whether the value in the polling table 66 is greater than the maximum count available. Such a count may be placed in the polling table 66 by the master node in order to have that nonmaster node address polled only on an infrequent time determined basis (not illustrated in the flow chart). If so, the process returns to block 110 for the incrementation of the node address. If the value in the polling table 66 and the particular node address is not equal to 0, at block 118, it indicates that that particular node address is not yet ready to receive a poll. Therefore, the process drops through to block 120 where the value in the polling table 66 for the particular node address is decremented by one and the process returns to block 110 where the node address 44 is then incremented. If the value set in the polling table 66 is equal to 0, then the polling process determines that that node address is ready to receive a poll and a poll is sent by the master node to the nonmaster node at block 122. At block 124, the polling process determines if a response to that poll was received by the master node from the polled nonmaster node. If no response was received, the polling process at block 126 increments the value in the unanswered polls column 64 of the polling table of FIG. 3. At block 128, the polling process determines whether the number of unanswered polls as determined in the unanswered poll column 64 is less than the maximum count, in this case, value FF. If the value in the unanswered poll column 64 is less than the maximum count then the polling process at block 130 sets the value in the polling table column 66 for that node address equal to the value in the dynamic polling priority table. This process prevents that node address from being polled until it either answers a poll from the master node or "times out" and is polled on a long time interval basis. If, at block 128, the value in the unanswered poll column 64 for that node address is not less than the maximum count, then, at block 132, the polling process sets the value in the dynamic polling priority column 62 for that node address equal to the maximum count and resets the value in the unanswered poll column 64 to zero. This reduces the dynamic polling priority for this particular node address to the maximum number and hence the minimum priority available. The polling process then, at block 130, sets the value in the polling table equal to the value in the dynamic polling priority table 62, which in this instance has just been set to the maximum count. The polling process then returns to block 110 where the node address is incremented. If, however, at block 124 the master node received a response from the polled nonmaster node, then at block 134 the master node examines that response to determine whether a large digital message block was requested. If no large digital message block was requested, then, at block 136, the value in the polling table is reset to the value in the dynamic polling priority table column 62 and the value in the unanswered polls column 64 set to zero. The process then returns to block 110 where the node address is incremented. If, however, at block 134 a large digital message block is requested, then at block 138 the value in the dynamic polling priority table 62 is set to the minimum count, thus, escalating the polling priority for this node address in order to service the large message block which is pending from this node address. Then at block 136 the value in the polling table column 66 is set equal to the value in the dynamic polling priority column 62, which in this case has just been set to the minimum count, and the value in the unanswered polls column 64 is set to 0. The process then returns to block 110 where the node address is incremented and the process is repeated for the next node address. Note that in this instance, if the nonmaster node polled at block 122 requested a large digital message block that that large digital message block is not sent at that time rather the priority of that node is increased and the at the next available poll of the receiving node the message sent by that node will be the send data signal and control of the communication channel 12 will be relinquished to the sending nonmaster node for the sending of the large digital message block.

Figure 5:
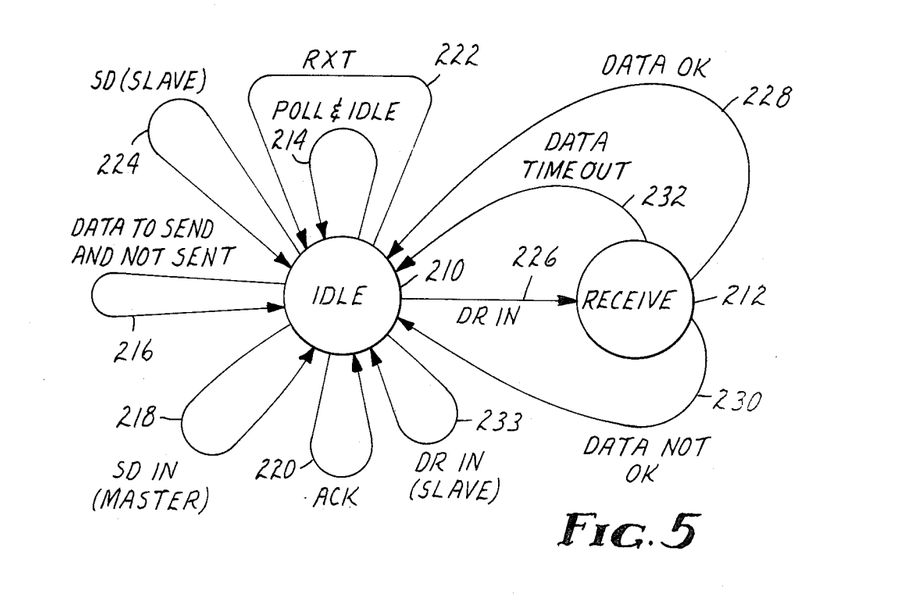
FIG. 5 is a state diagram of a nonmaster node, i.e., network interface element.
Figure 6:
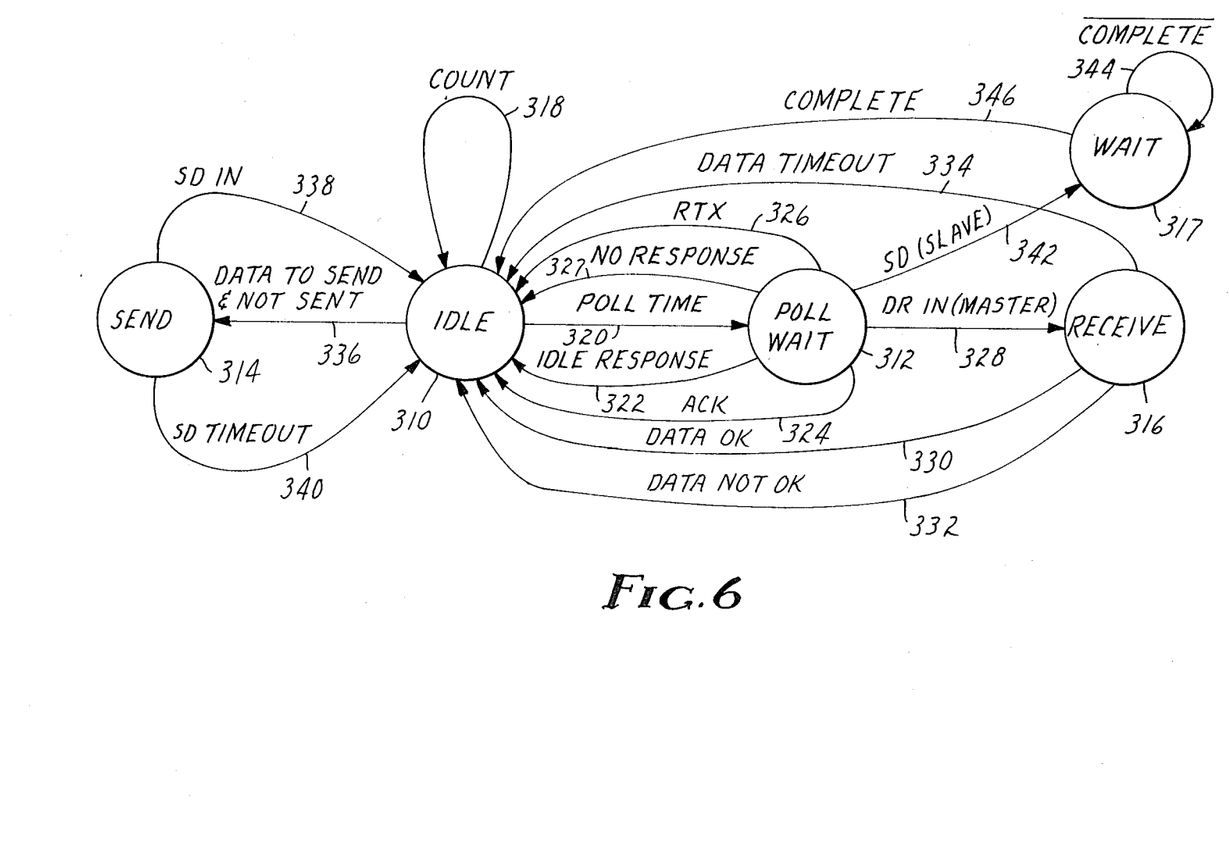
FIG. 6 is a state diagram of a master node, i.e., network interface element.

The specific actions to be taken by the nonmaster nodes and the master nodes can be more readily determined from the state diagrams of FIG. 5 and FIG. 6, respectively.

As illustrated in FIG. 5, the state diagram for a nonmaster node basically consists of two states, namely, idle state 210 and receive state 212. Other actions taken by the nonmaster node are transitions within or between the idle state 210 and receive state 212. The nonmaster node sits in idle state 210 until polled by the master node. When polled by the master node, this nonmaster node responds to a poll and idle 214 by sending a response to the master node indicating its status. This response is also used to send data to the master node or to other nonmaster nodes when the message to be sent is a small digital message block. If, however, the nonmaster node while in idle state 210 has a large digital message block to send, the nonmaster node in response to a poll from the master node by transition 216 indicates to the master node that it has data to send. The nonmaster node returns to idle state 210 and waits for the next poll. With the next poll from the master node, this nonmaster node from the idle state 210 then sends the data during transition 218 during which control of the communication channel 12 is passed to this nonmaster node. Following the termination of that large digital message block transmission, this nonmaster node returns to idle state 210. When polled again by the master node, this nonmaster node may receive an acknowledge signal transition 220 from the master node indicating the data was acknowledged in which case this nonmaster node then returns to idle state 210 knowing that the large digital message block was received. Instead, the nonmaster node may by transition 222 in a poll indicate to the nonmaster node by retransmit signal at transition 222 that the data was not received and must be retransmitted. In this instance, the nonmaster node would know to return to idle state 210 and at the next poll again respond to the master node with a data to send transition 216. Transition 224 is similar to transition 216 in that the nonmaster node responds to the master poll with a response of send data. However, transition 224 requests the data be sent to another nonmaster node, i.e., slave, rather than to the master itself. If the master node by its poll to the nonmaster node has data for the nonmaster node, then the poll indicates that it has a data ready to be sent to this nonmaster node. When later polled by the master node, the nonmaster node at transition 226 responds to the master node with a send data signal and transfers itself to the receive state 212. In receive state 212 the nonmaster node is set to receive a large digital message block either from the master node or from another nonmaster node which the master node has preconditioned. Following receipt of the large digital message block and when polled by the master node, the nonmaster node sends a data okay at transition 228 if the data received was acceptable. This acknowledgement indicates to the sending node that the data was received okay and need not be retransmitted. If in fact, however, the data was not okay and needs to be transmitted at transition 230, again in response to a poll from the master node, the nonmaster node sends a retransmit signal to the sending node. After a certain period of time of being in receive state 212 if no data is received, when polled by the master node, the nonmaster node by transition 232 will indicate to the master node when polled that it has timed out and is returning to the idle state 210 for further instructions. This prevents nonmaster node from being hung up in receive state 212 waiting for a large digital message block which is not forthcoming and preventing the sending or reception of small digital message blocks to this node or from this node address. A nonmaster node may receive a data ready signal whose source is another nonmaster node (as opposed to the master node) in a response by the other nonmaster to a poll to the other nonmaster node. If the nonmaster node receives a data ready signal from other than the master node, the nonmaster node, by transition 233, will return to the idle state 210 but condition itself to be ready to transmit a send data signal to the sending nonmaster node the next time this nonmaster node is polled. The sending of the send data signal during its poll time, will cause the nonmaster node, again by transition 226, to go to the receive state 212 and begin receiving the large digital message block. This allows the other nonmaster node to establish large digital message block communications between two nonmaster nodes.

The state diagram illustrated in FIG. 6 for a master node is somewhat more complicated since the master node must keep track of conditioning all other non master nodes for the transmission or reception of large digital message blocks. The base state for the master node is idle state 310. In idle state 310, the master node while not polling will keep track of incremental time by incrementing a time counter, at transition 318, and then returning to idle state 310. This counter is utilized to ensure that each node address is polled at some infrequent period of time, e.g., 1 second or 1 minute, to allow for dynamic connection or disconnection of data handling devices from communication channel 12. Communication over communication channel 12 consists of either small digital message blocks or large digital message blocks.

Small digital message blocks are sent in direct response to polls from the master node. If a master node has a small digital message block to send to a nonmaster node, then, when that particular node's poll time arrives, the master node will send the small digital message block along with the poll at transition 320 and enter poll and wait state 312. The master node will then receive a response from the nonmaster node and return to idle state 310 by transition 322. If, however, no response is received from the nonmaster node, then the master node again returns to idle state 310 this time through transition 327 durirg which the dynamic polling priority for that particular node may be adjusted, namely, decreased and the master node takes note of the fact that the message was not received by the nonmaster node. If the master node has no small message block for the nonmaster node but the nonmaster node wishes to send a small digital message block to the master node, then the master node will poll the nonmaster node normally at transition 320 and enter poll and wait state 312. The response provided by the nonmaster node will include the small digital message block to the master node and the master node will return under transition 322 to idle state 310 having received the small digital message block. Again, if no response is received from the nonmaster node, the master node will return under transition 327 to idle state 310 and adjust the polling priority for that nonmaster node. If during the poll time at transition 320, the nonmaster node has a small digital message block for another nonmaster node then the nonmaster node again sends that small digital message block in response to the poll and the master node again returns to idle state 310 through transition 322. The small digital message block will have a destination address of another nonmaster node rather than the master node and that small digital message block will be received by the node having the destination address at that time.

There are three possibilities of data communication involving large digital message blocks, namely, large digital message blocks from the master node to a nonmaster node, from the nonmaster node to the master node and between two nonmaster nodes. These three cases will be examined individually.

The first case is the case of the master node having a large digital message block for a nonmaster node. When the master node gets to poll time for that particular nonmaster node, the master node will transfer from idle state 310 over transition 336 by sending a data ready signal to the nonmaster node. The master node then waits in send state 314. The nonmaster node should then respond to that poll with a send data to the master node. If the send data is received, the master node at transition 338, will return to idle state 310 and in the process send the data associated with the large digital message block to the nonmaster node. At the next poll time for that particular node, or a later poll time, the master node will transfer over transition 320 to poll and wait state 312 and the nonmaster node will either acknowledge, under transition 324, or request retransmission, under transition 326, of the large digital message block. If the large digital message block is accurately acknowledged at transition 324, the master node will clear his flag indicating that he was waiting for acknowledgement and return to idle state 310. If retransmission is requested, at transition 326, the master node will clear his flag indicating the large digital message block has been sent and will, during a later poll time, again enter send state 314 to retransmit the large digital message block. While waiting in send state 314, the master node may not receive the send data signal from the particular nonmaster node. If this is the case, the master node will time out and will return to idle state 310 via transition 340 knowing that the transmission of the large digital message block has not been accomplished.

A nonmaster node may respond to a poll occurring during transition 320, while the master node is waiting in poll and wait state 312, with a data ready with a destination address of the master node indicating that the nonmaster node has a large digital message block it desires to send to the master node. The master node having received the data ready with a destination of the master node will, at transition 328, transfer to receive state 316 and in the process send the nonmaster node a send data signal. The send data signal is the nonmaster node's clearance to begin transmission of the large digital message block over communication channel 12. The master node will then wait at receive state 316 for the data transmission of the large digital message block to be completed. If the message is received and received acceptably, the master node, via transition 330, will transfer back to idle state 310 and will set its acknowledge flag and will during a subsequent poll to that nonmaster node acknowledge acceptable receipt of the large digital message block. If the message, however, was received and it was not acceptable, the master node, via transition 332, will return to idle state 310 and during a subsequent poll to that nonmaster node will request retransmission of the large digital message block. If, however, the nonmaster node fails to complete the data transmission associated with that large digital message block, the master node will time out and return via transition 334 to idle state 310 and proceed. The master node may at this point wish to adjust, namely, decrease, the polling priority for that nonmaster node.

If a nonmaster node has a large digital message block it desires to send to another nonmaster node, the nonmaster node in response to a poll, at transition 320, while the master node is in poll and wait state 312, will send a data ready signal from with a destination address of another nonmaster node (rather than the master node itself). The master node at this time will return under transition 322 to the idle state 310 but make note of the fact that the nonmaster node to which the data ready was addressed is targeted to receive a large digital message block. The master node may at this time increase the dynamic polling priority of both the sending nonmaster node and the receiving nonmaster node. During poll time to that receiving nonmaster node, that nonmaster node will, if it chooses, respond to the poll of the master node by sending a send data with the sending nonmaster node's destination address. The master node then from poll and wait state 312 will go to wait state 317 via transition 342. The send data signal to the sending nonmaster node will commence the transmission of the data associated with the large digital message block. Master node, having reliquished control of the communication channel 12, will remain in wait state 317 while the message is not complete, transition 344. When the large digital message block has been completely transmitted, the master node will transfer, via transition 346, back to idle state 310. The nonmaster nodes in response to subsequent polls via small digital message blocks may send acknowledge or retransmit signals indicating accurate or inaccurate receipt of the large digital message block.

Thus, FIG. 6 describes the state diagram of the master node for one associated nonmaster node. It is to be recognized and understood that the master node has a complete state diagram as illustrated in FIG. 6 for each nonmaster node in the communication system 10. When the master node returns to idle state 310 for that node and the polling pointer is incremented for the next node address, then the state diagram associated with that next nonmaster node is entered and the process is repeated.

Thus, it can be seen that both the master node, represented in FIG. 1 by network interface element 26, and the nonmaster nodes, represented in FIG. 1 by network interface elements 28, 30, 32, 34 and 36, have one protocol for sending small digital message blocks and a second protocol for sending large digital message blocks. Small digital message blocks are sent in direct response to the poll to or from the master node or from one nonmaster node to a second nonmaster node in direct response to the poll of the master node. If, however, a large digital message block is required to be sent, the nodes transfer to a different state and transmit that large digital message block on an asynchronous basis. It is this unique dual protocol transmission system for small digital message blocks and large digital message blocks along with the dynamic polling process of the master node which enables the communication system 10 of the present invention to efficently service a multiplicity of users and users having large digital message blocks together in a single communication system 10.

While it has been described that a single large digital message block is sent asynchronously to or from a master node or to or from a nonmaster node, it is to be recognized and understood that a complete digital message may consist of a plurality of large digital message blocks. As an example, a digital image may consist of an array of 512 by 512 pixels each pixel containing 16 data bits. An image of this size would require eight large digital message blocks each consisting of 524,288 bits (64 kilobytes) in order to be sent.

The communication system 10 of the present invention also recognizes the eventuality that a malfunction may occur within the master node, network interface element 26. In such an event, the communication system 10 will continue to operate. Each node has a timing means for determining the amount of time since any node has been polled. Each node may mathematically operate on that predetermined time as a function of its node address which each nonmaster node is aware. Thus, each nonmaster node may have a predetermined set amount of time unique to its particular node address. When that particular predetermined amount of time for a particular node address has been passed without any polling occurring, then the nonmaster node will assume active master node status and begin polling other nodes as if it were and has been the master node in the communication system 10. Thus, the communication system 10 may operate even if a failure occurs within the master node. In another embodiment of the communication system of the present invention, a given node may relinquish its master status upon receiving a request, in response to its poll, from another node having higher priority. In one particular preferred embodiment, that higher priority would be determined by the node address unique to that particular node.

The performance of the communication system 10 of the present invention was analyzed for a preferred application involving the generation, transmission and archiving of digital images of 512 by 512 pixels such as can be displayed on a high quality display monitor. User dialog was assumed to be primarily accessed to the data base of these digital images via small digital message blocks. Image transfer requests were assumed to incur independently at each node at time intervals which are exponentially distributed with identical parameters and at an average rate of 1 request per node for each 15 seconds. Each request was assumed to require 18 data base messages, i.e., 18 small digital message blocks. The communication channel rate assumed to be 3 megabits per second with a physical length of 800 meters, resulting in a delay of 4 microseconds. It is assumed that the time required to poll a node was on the average 250 microseconds. For comparision with an Ethernet and a token ring the analysis of Werner Bux from *Local Area Subnetworks: A Performance Comparision* IEEE Transactions Communications COM-29 (10), October 1981, was used. Optimistic parameters where chosen for these networks and performance trials have shown that Ethernet and token ring nets can become unstable at utilization levels of 60% whereas the Werner Bux model parameters predict reasonably good behavior until 80% utilization.

Figure 7:
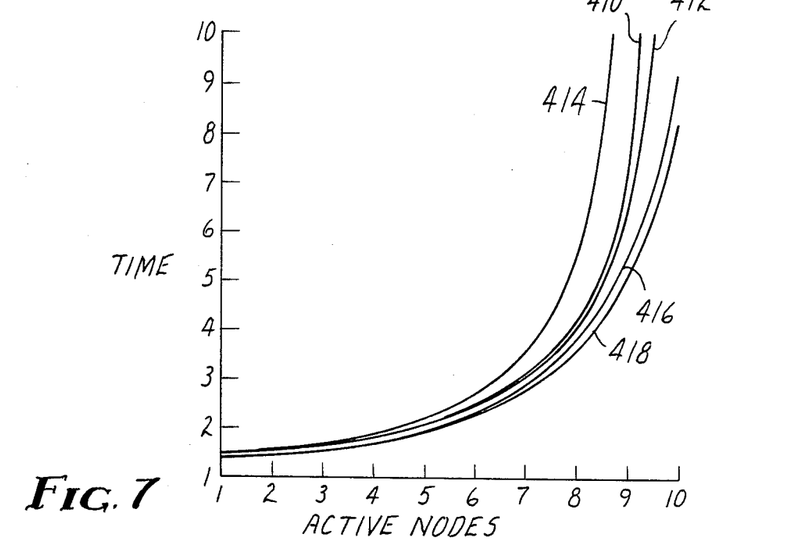
FIGS. 7 and 8 represent the performance of ethernet and token rings with different packet sizes.

The performance comparisions are presented in FIG. 7 for the optimum packet size for each network, i.e., 512 bytes for Ethernet and token ring and 16,384 bytes for the communication system and method of the present invention. The vertical axis of FIG. 7 gives the expected transfer time in seconds required to transfer an image and the horizontal axis is the number of communicating nodes on the network. The expected transfer time for any network under the assumptions made above will become infinite or undefined for more than 10 nodes because the transfers will stack up. However, under the communication system 10 and method of the present invention, the transfers remain stable in the sense that the communication system doesn't stop working but just cannot satisfy the request made of it in real time.

Figure 8:
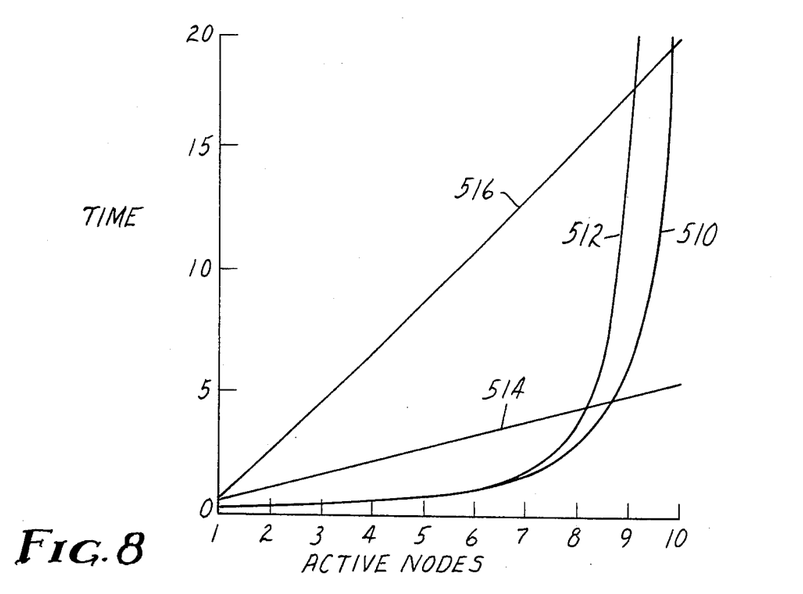

In FIG. 7 line 410, represents the performance of Ethernet with a packet size of 512 bytes. Line 412 represents the token ring net with a packet size of 512 bytes. Line 414 represents both Ethernet and token ring net with a packet size of 4,096 bytes. Line 416 represents the performance of the communication system of the present invention with a packet size of 16,384 bytes and line 418 represents the performance of the communication system of the present invention with a packet size of 65,536 bytes. Another measure of the performance of a communication system is the analysis of the time required to send a small digital message block in a communication system which only handles short digital message blocks. This is the only measure of performance. In an image transmitting communication system, however, the transmission of images, i.e., large digital message blocks, seriously hampers the transmission of small digital message blocks. FIG. 8 represents the expected time required, in milliseconds, for transmitting a single small digital message block versus the number of large digital message block transmiting nodes on the communication system. The times required for Ethernet and token ring net grow rapidly at high utilization rates. For the communication sysBbzHem of the present invention, the times are essentially a linear function of the number of nodes and remain so even under conditions of overloading. In fact, even if more than 10, for this model, nodes want to send large digital message blocks, any node can still send small digital message blocks In addition, many more nodes can be attached to the network and they can all get service even near maximum loading of the communication system by large digital message block transmitting nodes. In the graph of FIG. 8 line 510 represents the performance of Ethernet and token ring net with a packet size of 512 bytes and line 512 represents the performance of Ethernet and token ring net with a packet size of 4,096 bytes. It is clear from the graph that lines 510 and 512 grow exponentially. Line 514 represents the performance of the communication system of the present invention with a packet size 4,096 bytes and line 516 represents the performance of the communication system of the present invention with a packet size of 16,384 bytes. Lines 514 and 516 grow linearly in the graph of FIG. 8.

Thus there has been shown and described a novel communication system for the transfer of small digital message blocks and large digital message blocks. It is to be recognized and understood, however, that various changes modifications and substitution in the form and the details of the present invention may be made by those skilled in the art without departing from the scope of the following claims.

What is claimed is:

1. A communication system for the transfer of small digital message blocks and large digital message blocks, comprising:

a common communication channel capable of facilitating the transfer of small digital message blocks and large digital message blocks, said large digital message blocks being at least about 4,096 bytes and said large digital message blocks being at least about 8 times said small digital message blocks;

a plurality of nodes connected to said channel, each being adapted to be coupled to a digital handling device;

one of said plurality of nodes being designated as a master node, said master node controlling communication on said channel by selectively polling the other of said plurality of nodes;

said communication system having a first protocol for the transmission of small digital message blocks and having a second protocol for the transmission of said large digital message blocks;

said first protocol, in direct response to said poll, being a data communication of said small digital message block or a request to send or receive said large digital message block and said second protocol being the direct communication between said nodes of said large digital message blocks;

said master node establishing a polling priority for each of said plurality of nodes and polling those of said plurality of nodes with a higher of said polling priority more frequently than those of said plurality of nodes with a lower of said polling priority;

said master node allowing the one of said plurality of of nodes which is being polled to communicate without interruption over said channel with either said small digital message block or said large digital message block;

said master node adapting said polling priority for each of said plurality of nodes based upon a predetermined algorithm.

2. A communication system as in claim 1 wherein said master node adapts said polling priority for each of said plurality of nodes based upon whether a given node has recently had a digital message communication and based upon whether such digital message communication was a small digital message block or a large digital message block.

3. A communication system as in claim 2 in which a series of said large digital message blocks form a complete message.

4. A communication system as in claim 2 in which said polling priority for one of said plurality of nonmaster nodes is increased when said one of said plurality of nonmaster nodes has recently had a digital message communication.

5. A communication system as in claim 4 in which said polling priority for one of said plurality of nonmaster nodes is increased still further when said one of said plurality of nonmaster nodes has recently had digital message communication utilizing a large digital message block.

6. A communication system as in claim 5 in which said polling priority for one of said plurality of nonmaster nodes is decreased when said one of said plurality of nonmaster nodes is inactive.

7. A communication system as in claim 6 in which one of said plurality of nonmaster nodes with said polling priority being low is polled only infrequently.

8. A communication system as in claim 7 wherein each of said nodes in said communication system has a unique address and in which periodically all possible of said unique addresses are polled by said master node.

9. A communication system as in claim 3 which further comprises:
   timing means for determining the amount of time since any of said plurality of nodes has last been polled; and
   wherein each of said plurality of nodes can assume active master status when said amount of time has exceeded a predetermined set amount of time unique to each of said plurality of nodes;
   whereby a master node may be selected without direct communication between any of each of said plurality of nodes.

10. A communication system as in claim 9 wherein each of said plurality of nodes in said communication system has a unique address and in which said predetermined set amount of time in proportional to said unique address.

11. a communication system as in claim 10 wherein said master node;
   relinquishes master node status based upon a predetermined protocol upon receiving a communication involving an external poll from another of said plurality of nodes having a higher node priority.

12. A communication system as in claim 11 wherein said relinquishing step occurs whenever said given one of said plurality nodes is polled from another one of said plurality of nodes whose said unique address is lower than said unique address of said given one of said plurality of nodes.

13. A communication system as in claim 1 wherein said master node may pass said designation as a master node to one of said other of said othe of said plurality of nodes by way of a certain small digital message block to one of said other of said plurality of nodes.

14. In a communication system having a wideband common communication channel, having a master node and a plurality of nonmaster nodes each being coupled to said channel and each capable of transmitting and receiving digital messages, each of said plurality of nodes being coupled to a data handling device, a method of establishing communication in said communication system for the transfer of large digital message blocks and of small digital message blocks over said wideband communication channel, said large digital message blocks being at least about 4,096 bytes and said large digital message blocks being at least about 8 times said small digital message blocks, comprising the steps of:
   determining a polling priority for each of said plurality of nonmaster nodes;
   said master node successively polling each of said plurality of nonmaster nodes, said master node polling those of said plurality of nonmaster nodes with a higher priority more frequently than those of said plurality of nonmaster nodes with a lower polling priority;
   allowing the one of said plurality of nonmaster nodes which is being polled to communicate over said communication channel without interruption with either a first protocol for the transmission of said small digital message blocks or a second protocol for the transmission of said large digital message blocks, said first protocol being either a data communication of said small digital message block or a request to send or receive said large digital message block, and said second protocol being the direct communication between said nodes of said large digital message block;
   adapting said polling priority for each of said plurality of nonmaster nodes based upon whether a given one of said plurality of said nonmaster nodes has recently had a digital message communication and based upon whether such digital message communication was a small digital message block or a large digital message block.

15. A method as in claim 14 in which a series of said large message blocks form a complete message.

16. A method as in claim 15 in which said polling priority for one of said plurality of nonmaster nodes is increased when said one of said plurality of nonmaster nodes has recently had a digital message communication.

17. A method as in claim 16 in which said polling priority for one of said plurality of nonmaster nodes is increased still further when said one of said plurality of nonmaster nodes has recently had digital message communication utilizing a large message block.

18. A method as in claim 17 in which said polling priority for one of said plurality of nonmaster nodes is decreased when said one of said plurality of nonmaster nodes is inactive.

19. A method as in claim 18 in which one of said plurality of nonmaster nodes with said polling priority being low is polled only infrequently.

20. A method as in claim 19 in which each of said nodes in said communication system has a unique address and in which periodically all possible of said unique addresses are polled by said master node.

21. A method as in claim 14 in the process of establishing which of said plurality of nodes is master node comprises the steps of having each of said plurality of nodes:
   time the amount of time since said plurality of nodes has last been polled; and
   assuming active master status when said time has exceeded a predetermined set amount of time unique to each of said plurality of nodes.

22. A method as in claim 21 in which each of said plurality of nodes in said communication system has a unique address and in which said predetermined set amount of time in proportional to said unique address.

23. A method as in claim 22 which comprises the following additional step:
   relinquishing master node status for a given one of said plurality of nodes based upon a predetermined protocol upon receiving a communication involving an external poll from another of said plurality of nodes having a higher node priority.

24. A method as in claim 23 wherein said relinquishing step occurs whenever said given one of said plurality nodes is polled from another one of said plurality of nodes whose said unique address is lower than said unique address of said given one of said plurality of nodes.

* * * * *

UNITED STATES PATENT AND TRADEMARK OFFICE
CERTIFICATE OF CORRECTION

PATENT NO. : 4,763,323

DATED : August 9, 1988

INVENTOR(S) : Nelson et al

It is certified that error appears in the above-identified patent and that said Letters Patent is hereby corrected as shown below:

Col. 8, line 24, "dyanamir" should read --dynamic--.

Col. 15, line 36, "SysBbzHem" should read --system--.

Col. 15, line 42, insert a period after "blocks".

Col. 16, lines 7-9, delete "a plurality of nodes connected to said channel, each being adapted to be coupled to a digital handling device" and substitute therefor -- a plurality of nodes coupled to said channel, each being capable of communicating over said channel and each adapted to be coupled to a digital handling device --.

Col. 16, line 30, delete "of".

Col. 17, line 32, delete "said othe of".

Signed and Sealed this

Fourteenth Day of February, 1989

Attest:

DONALD J. QUIGG

Attesting Officer

Commissioner of Patents and Trademarks